United States Patent
Haskew et al.

(10) Patent No.: US 9,880,973 B2
(45) Date of Patent: Jan. 30, 2018

(54) SYSTEM AND METHOD FOR DETERMINING WHEN TO TURN OFF ENGINES

(71) Applicant: Board of Trustees of The University of Alabama, Tuscaloosa, AL (US)

(72) Inventors: Timothy Austin Haskew, Northport, AL (US); Paulius V. Puzinauskas, Tuscaloosa, AL (US); Joshua Spiegel, Madison, AL (US); Andrew Greff, Tuscaloosa, AL (US)

(73) Assignee: Board of Trustees of The University of Alabama, Tuscaloosa, AL (US)

( * ) Notice: Subject to any disclaimer, the term of this patent is extended or adjusted under 35 U.S.C. 154(b) by 358 days.

(21) Appl. No.: 14/688,312

(22) Filed: Apr. 16, 2015

(65) Prior Publication Data
US 2015/0300172 A1 Oct. 22, 2015

Related U.S. Application Data

(60) Provisional application No. 61/980,225, filed on Apr. 16, 2014.

(51) Int. Cl.
*G01N 33/04* (2006.01)
*G06F 17/10* (2006.01)
*G01M 15/10* (2006.01)

(52) U.S. Cl.
CPC ........... *G06F 17/10* (2013.01); *G01M 15/102* (2013.01)

(58) Field of Classification Search
None
See application file for complete search history.

(56) References Cited

U.S. PATENT DOCUMENTS

| | | | | |
|---|---|---|---|---|
| 6,208,256 B1* | 3/2001 | Fleming | ............... | B60K 28/066 180/271 |
| 6,433,696 B1* | 8/2002 | Deiterman | ........... | G01N 33/004 340/632 |
| 6,436,712 B1* | 8/2002 | Yurgil | .................. | G01N 33/004 123/396 |

(Continued)

FOREIGN PATENT DOCUMENTS

| | | | | |
|---|---|---|---|---|
| WO | WO 0133213 A2 * | 5/2001 | ........... | G01N 33/004 |
| WO | WO 03002204 A3 * | 4/2003 | ............. | A62B 9/006 |

OTHER PUBLICATIONS

Delphi Powertrain Systems, "Delphi MT05 Engine Control Module Series," Specifications, http://delphi.com/shared/pdf/ppd/pwrtrn/mt05.pdf, 2007, 2 pages.

(Continued)

*Primary Examiner* — Ronald Hartman, Jr.
(74) *Attorney, Agent, or Firm* — Meunier Carlin & Curfman LLC

(57) ABSTRACT

Systems and methods for determining when to turn off an engine are described. The systems and methods may identify when an amount of carboxyhemoglobin exceeds a predetermined threshold; and monitor the amount of carboxyhemoglobin for a period of time. The systems and methods may determine when the amount of carboxyhemoglobin exceeds the predetermined threshold during the time period; and turn off the engine when the amount of carboxyhemoglobin exceeds the predetermined threshold during the time period.

21 Claims, 5 Drawing Sheets

(56) References Cited

U.S. PATENT DOCUMENTS

| | | | | |
|---|---|---|---|---|
| 7,408,473 | B2* | 8/2008 | Adkins | G08B 21/14 340/603 |
| 7,746,240 | B2* | 6/2010 | Vij | G08B 21/14 340/540 |
| 2011/0015875 | A1* | 1/2011 | Walte | G01N 33/0032 702/24 |
| 2013/0021119 | A1* | 1/2013 | Sid | B60K 28/10 335/1 |
| 2015/0268210 | A1* | 9/2015 | Cristoforo | G08B 21/14 702/24 |
| 2015/0276693 | A1* | 10/2015 | Sid | B60K 28/10 307/116 |
| 2016/0090958 | A1* | 3/2016 | Berkson | B60H 1/00978 701/112 |
| 2017/0058741 | A1* | 3/2017 | Fosaaen | G01N 27/4067 |

OTHER PUBLICATIONS

Emmerich, S.J., et. al., "Modeling and Measuring the Effects of Portable Gasoline Powered Generator Exhaust on Indoor Carbon Monoxide Level," NIST Technical Note 1781, National Institute of Standards and Technology Report, U.S. Department of Commerce, 2013, 155 pages.

Emmerich, S.J., "Measured CO Concentrations at NIST IAQ Test House from Operation of Portable Electric Generators in Attached Garage < Interim Report," 2011, 44 pages.

Haskew, T.A., et al., "Algorithm Development for Enclosed Operation Detection and Shutoff of a Portable Gasoline-Powered Generator," Additional Volume to Final Project Report, Contract CPSC-S-06-0079, 2011, 66 pages.

Inkster, S., "A comparison of the carbon monoxide (CO) poisoning risk presented by a commercially-available portable gasoline-powered generator versus a prototype 'reduced CO emissions' generator, based on Mmodeling of carboxyhemoglobin (COHb) levels from empirical CO data," Memorandum, Consumer Product Safety Commission, Bethesda, MD, Aug. 13, 2012, 79 pages.

Mathworks Website, http://www.mathworks.com/products/matlab/, (last accessed on Nov. 28, 2015), 2012, 7 pages.

Nabinger, S., et al., "Airtightness, Ventilation, and Energy Consumption in a Manufactured House: Pre-Retrofit Results," NISTIR 7478, National Institute of Standards and Technology, U.S. Department of Commerce, 2008, 31 pages.

National Instruments, http://www.ni.com/labview/, Labview website homepage, (last accessed on Nov. 28, 2015), 2012, 2 pages.

National Instruments, "NI cRIO-9022," Data Sheet, http://sine.ni.com/ds/app/doc/p/id/ds-202/lang/en, 2012, 7 pages.

Nova Analytical Systems, Model 376WP: Portable Flue Gas Analyzer for Oxygen, Carbon Monoxide, Carbon Dioxide and Oxides of Nitrogen, Weatherproof (WP) Enclosure, 2010, 3 pages.

Puzinauskas, P.V., et. al., "Low Carbon Monoxide Emission Prototype Portable Generator: Build Description and Performance Evaluation," Contract CPSC-S-06-0079 Final Project Report, 2011, 63 pages.

Smelser, J.B., et al., "Oxygen Depletion Shutdown Algorithm for Portable Gasoline Generators," Thesis, The University of Alabama, 2009, 75 pages.

Spiegel, J.P., "Small Engine Oxygen Depletion Shutoff Algorithm and Implementation," Thesis, The University of Alabama, 2012, 125 pages.

United States Environmental Protection Agency, Office of Pollution Prevention and Toxics, "Carbon Monoxide (CAS Reg. No. 630-08-0), Proposed Acute Exposure Guideline Levels (AEGLs)," Public Draft, Federal Register—Feb. 2001, 88 pages.

\* cited by examiner

SYSTEM AND METHOD FOR DETERMINING WHEN TO TURN OFF ENGINES

CROSS REFERENCE TO RELATED APPLICATIONS

This application claims priority to and benefit of U.S. Provisional Patent Application Ser. No. 61/980,225 filed on Apr. 16, 2014, which is fully incorporated by reference and made a part hereof.

BACKGROUND

Carbon monoxide poisoning as a result of exhausts gases from gasoline-powered generators is a serious problem. Every year, many people suffer adverse health effects or even death from carbon monoxide poisoning. It is particularly dangerous because it is colorless, odorless, and often may go unnoticed. Engines that burn fuel output varying levels of carbon monoxide. While technologies such as catalytic converters can reduce the output of carbon monoxide, the dangers of carbon monoxide from exhaust gases remain when running an engine, particularly in enclosed areas.

For example, generators are often run indoors. Running a generator in a poorly ventilated area for even a brief period of time can be dangerous. In the past, some generators have included special carbon monoxide detectors to warn users of increasing toxicity. These detectors, however, are typically placed on the generator itself, which can lead to high readings in the area immediately around the generator that will shut down a generator prematurely. Further, carbon monoxide sensors add costs to a generator, and also often have a short lifespan due to vibrations from the generator itself.

As a result, there is a need for systems and methods for detecting dangerous levels of carbon monoxide, without using a carbon monoxide detector, and turning off an engine automatically.

SUMMARY

Systems and methods disclosed herein can be used to in an engine control unit (computer) operating a portable gasoline generator. An algorithm may use data that is normally sensed to control the fuel delivery, spark timing, and other typical aspects of engine operation to determine if the engine is operating in an enclosed environment where carbon monoxide poisoning could occur. If this is the case, the algorithm may shut down the engine. As a result, carbon monoxide levels can be determined without a carbon monoxide detector.

Other systems, methods, features and/or advantages will become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The accompanying drawings, which are incorporated in and constitute a part of this specification, illustrate embodiments and together with the description, serve to explain the principles of the methods and systems.

DESCRIPTION

Figure 1:
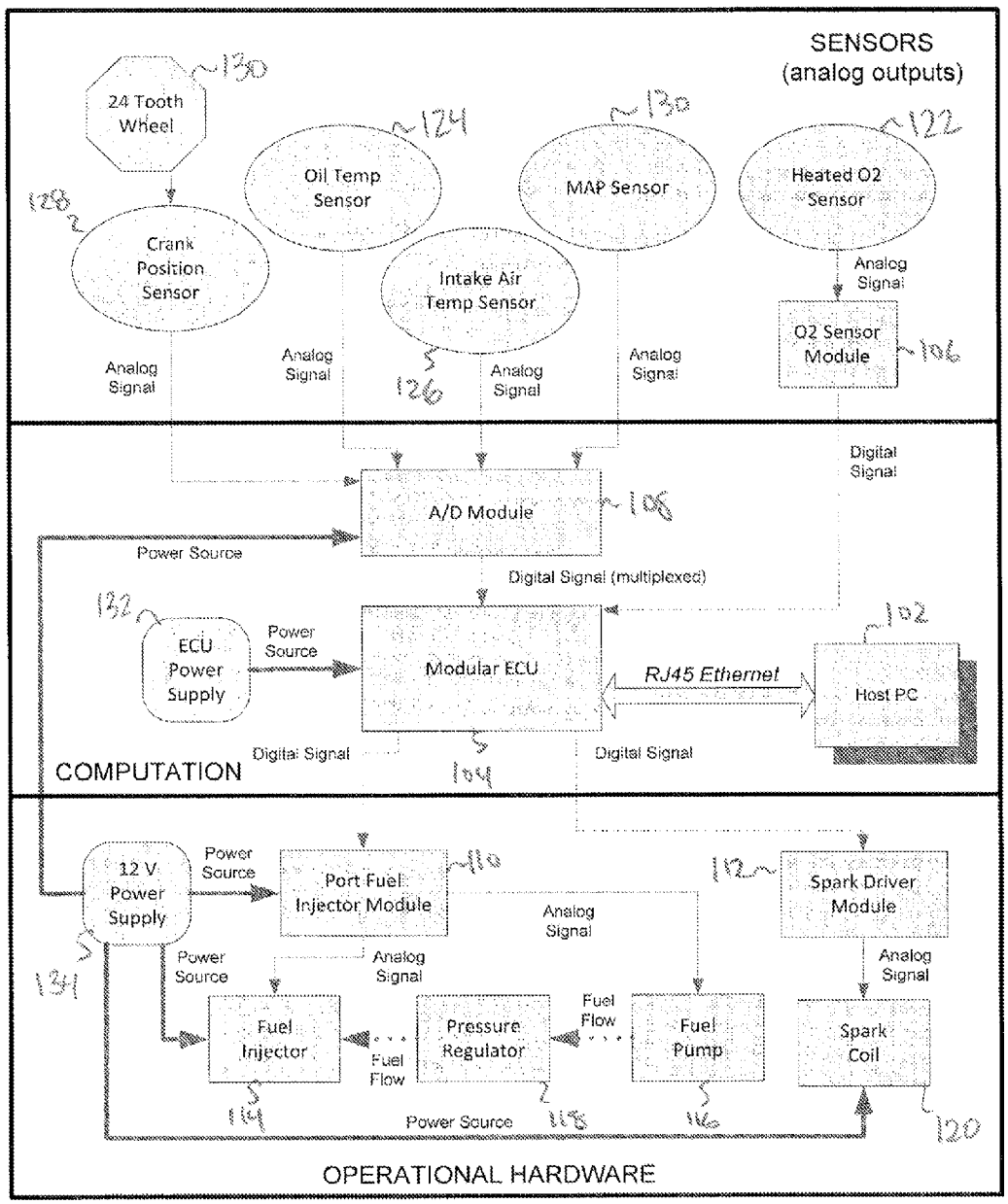
FIG. 1 illustrates an exemplary system for determining when to turn off an engine.

The systems and methods described herein may turn an engine off before it creates an unacceptable carbon monoxide exposure environment. An engine's control unit ("ECU") may determine when to turn off an engine based on data already existing in the ECU, without using any additional sensors for carbon monoxide detection. The ECU can handle the scenarios of a light load, a constant load, and sudden and significant load changes, without turning off the engine prematurely. The ECU may be onboard or off board relative to the engine.

The approach may be based on employing data from the ECU to estimate the oxygen concentration in the intake air and developing an index for the shutoff decision that may be based upon a calculation that estimates the predicted formation of carboxyhemoglobin (COHb), which is a useful approximation of acute carbon monoxide uptake by the body, and also of acute symptom severity. The system may operate with an industry standard graphical user interface providing full programming flexibility in a real-time manner.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes¬from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

FIG. 1 illustrates an exemplary layout and flow of an exemplary engine management system (EMS) 100, including the host PC 102, real-time ECU 104, a connected chassis with four engine control modules 106, 108, 110, and 112, and multiple inputs/outputs to the generator. All bold lines indicate a voltage signal and all dashed lines indicate signals to or from engine control modules harbored in the ECU chassis. Additional signals are labeled accordingly.

Engine management system 100 may manage multiple engine tasks, such as engine position tracking and synchronization of engine fuel and spark timing. One exemplary EMS setup may include a host personal computer (PC) 102, an ECU 104, an electronic fuel injector 114, a fuel pump 116 and pressure regulator 118, and an ignition coil 120, along with multiple sensors for continuous engine operation monitoring. The host PC 102 may be optional and may be used for human interfacing with ECU 104 to monitor and adjust engine specific parameters. The ECU 104 may be an electronic based system with multiple inputs and multiple outputs used to enhance engine performance. Specifically, the ECU 104 may execute calculations based on data provided from engine sensors and control associated outputs to achieve desired engine operation. Examples of inputs and outputs to the modular ECU are shown below in Table 1. Of course, fewer or additional sensors may be used for a particular application, depending on the complexity and nature of the engine.

TABLE 1

Input and output signals of the modular ECU.

| Signal | Input/Output | Type |
| --- | --- | --- |
| Oil Temperature | Input | Analog |
| Intake Air Temperature | Input | Analog |
| Manifold Absolute Pressure | Input | Analog |
| Heated Oxygen Sensor | Input | Analog |
| Battery Voltage | Input | Analog |
| Crank Position | Input | Pulse |
| Fuel Injector | Output | Digital |
| Spark Coil | Output | Digital |

The individual inputs and outputs to the ECU 104 may serve a specific role in the overall engine control scheme. The two exemplary ECU outputs, for the fuel injector and spark coil, together serve a common purpose of permitting fuel delivery and spark timing for fuel ignition through the electronic fuel injector 114, fuel pump 116, fuel pressure regulator 118, and ignition coil 120. The heated oxygen sensor 122 may detect oxygen content in the exhaust gas and determine whether the fuel mixture is rich or lean through means of a corresponding voltage signal. The oil temperature sensor 124 may monitor the temperature of the engine's oil. The intake air temperature (IAT) sensor 126 may monitor the temperature of air entering the engine.

The oil temperature sensor 124 and intake air temperature sensor 126 may provide signals that contribute to various calculations and look-up tables for parameters which effect engine operation. The crank position sensor 128 may be a variable reluctance sensor, used in conjunction with a crank wheel, such as a twenty-four tooth wheel 130, as will be understood by a person of skill in the art, to define engine speed (RPM) and a crank position reference point. By establishing a crank position reference point, engine parameters such as manifold absolute pressure (MAP), fuel delivery, and spark timing can be evaluated.

Via a variable reluctance sensor, a pulse train voltage signal may be produced by a crank wheel having multiple teeth by exciting the crank position sensor 128 that has magnitude proportional to engine speed. A missing tooth, or gap, on the crank wheel may be used as a reference point by the crank position sensor 128 for determining several useful parameters. First, the missing tooth may establish a reference point for determining when the piston is at top dead center (TDC). In addition, the missing tooth and crankshaft synchronization system may ensure that, at minimum pressure on the engine's intake stroke, the MAP read crank angle can be determined Due to MAP signal fluctuation, caused by the single-cylinder engine, a MAP read crank angle algorithm may establish a common MAP determination point. The MAP read crank angle is a function of speed and load, which may use a calibration look-up table. Since MAP is the primary variable used to indicate load, MAP read crank angle, sampled at, for example, once per two engine revolutions at minimum pressure, may be based upon MAP itself.

The exemplary EMS 100 may contain or be connected to four operational modules for engine control and one instrumentation module, not included in the EMS diagram, for additional data acquisition. The five modules harbored in the chassis may include, for example, the following: A/D Combo Module Kit 108, Port Fuel Injector (PFI) Driver Module Kit 110, Spark Driver Module Kit 112, Oxygen Sensor Module Kit 106, and Bidirectional Digital I/O Module (not shown). The A/D Combo Module Kit 108 may interface between any analog or digital inputs on the generator, such as those sensors which indicate operating conditions. Specifically, the A/D Combo Module Kit 108 may convert the generator oil temperature 124, intake air temperature 126, crank position sensor 128, and MAP sensor 130 from analog to digital signals, which can be monitored and utilized in separate calculations. The Port Fuel Injection Driver Module Kit 110 may drive low-impedance and high-impedance Port Fuel Injectors as well as generator solenoid valves.

Specifically, Port Fuel Injection Driver Module Kit 110 may control the generator's fuel pump 116 and fuel injector 114. The Spark Driver Module Kit 112 may control the spark coil 120, ensuring precise timing for correct engine synchronization. The Oxygen Sensor Module Kit 106 may interface with wide-band and narrow-band oxygen sensors 122. Specifically, the Oxygen Sensor Module Kit 106 may be used for engine tuning, closed-loop engine control, and data acquisition. The Bidirectional Digital I/O Module (not shown) may output digital signals to an analog oscilloscope. This module allows for rapid controller and engine debugging, without having to modify and recompile the associated source code. Also illustrated in FIG. 1 are ECU power supply 132 and a 12V power supply 134 for powering various components of EMS 100.

The previously described control modules may be supported by graphical virtual instruments. In addition, the system may utilize calibration software, necessary for establishing communications between the real-time kernel and the host virtual instrument by managing necessary data points and lookup tables. The host virtual instrument may monitor and control any desired system input or output in a real-time manner. Open-loop and closed-loop engine tuning for stoichiometric engine operation may also be performed in the host virtual instrument, in real-time.

A brief overview of engine operation will now be provided. A parallel deterministic approach and set of principle equations may be used, which utilize the primary inputs of engine speed and a load variable, based on MAP 130, for ultimately controlling the mass of fuel delivered through fuel injectors 114. The speed-density method, based on the ideal gas law, may be used to calculate the quantity of air entering the engine, thus delivering a stoichiometric fuel mixture to the engine. The ideal gas law is shown in Equation 2.1 where (P) is pressure, (V) is volume, (m) is mass, (R) is the air gas constant, and (T) is temperature. The actual mass of air entering the cylinder divided by the theoretical mass of air entering the cylinder is defined as the volumetric efficiency, shown in Equation 2.2. As seen in Equation 2.2, the theoretical mass of air entering the cylinder is equal to the product of the air density entering the cylinder ($\rho_{air}$) and the engine displacement volume ($V_D$). As part of the calibration procedure, the volumetric efficiency is determined as a function of engine speed and load and may be entered into a lookup table for reference when calculating air flow.

$$P*V = m*R*T \tag{2.1}$$

$$VE = \frac{m_{air}(\text{actual})}{m_{air}(\text{theoretical})} = \frac{m_{air}}{\rho_{air}*V_D} \tag{2.2}$$

Because the air is an ideal gas, a relationship with the ideal gas law can be developed. Specifically, by combining Equation 2.1 with the fact that air density is defined by air mass divided by air volume, the manifold air density can be calculated in terms of the specific pressure, temperature, and air gas constant. The manifold density is directly proportional to the manifold pressure ($P_{man}$) and inversely proportional to the manifold temperature ($T_{man}$), as shown in Equation 2.3.

$$\rho_{man} = \frac{P_{man}}{R*T_{man}} \tag{2.3}$$

Using the combination of Equations 2.2 and 2.3, equating air density entering the cylinder to manifold air density, the actual mass of air entering the cylinder is calculated, as shown in Equation 2.4, with respect to the specific manifold conditions. A unique relationship between Equation 2.3 and the current EMS can be drawn by the following parameters: $P_{man}$=MAP (kPa), $V_D$=volume of the cylinder, 389 (cm$^3$), R=air gas constant, 0.286 (kJ/[kg*K]), and $T_{man}$=charge air temperature (CAT) (° C.). The charge air temperature calculation may be used to estimate the air temperature entering the cylinder, based on correlation depending upon an RPM and MAP based coefficient lookup table, intake air temperature, and oil temperature (CLTS).

$$m_{air} = \frac{P_{man}*V_D*VE}{R*T_{man}} \tag{2.4}$$

The calculated mass of air entering the cylinder may be used by the ECU 104 to determine the desired mass of fuel to be supplied to the engine, shown in Equation 2.5, based on the desired air-fuel ratio set point, such as 14.6 to 1. Equation 2.5 can be combined with equation 2.4 to express the desired mass of fuel to be supplied to the engine (per cycle) in terms of parameters measured as the engine operates ($P_{man}$, $T_{man}$), obtained from a calibration lookup table (volumetric efficiency, air-fuel ratio) as a function of speed and load, and constant values ($V_D$, R), as shown in Equation 2.6.

$$m_{fuel} = \frac{m_{air}}{AFR(\text{desired})} \tag{2.5}$$

$$m_{fuel} = \frac{P_{man}*V_D*VE}{R*T_{man}*AFR(\text{desired})} \tag{2.6}$$

The ECU 104 may attempt to deliver the desired fuel mass (per cycle) by controlling the fuel injector 114 opening pulse width based on injector flow rate. The injector flow rate may be used by the ECU, in conjunction with various transient fuel parameters, to calculate the injector fuel pulse width (FPW), thus ensuring that the correct mass flow rate of fuel is delivered. A fuel pressure regulator 118 is used to maintain constant pressure across the fuel injector's exit nozzle, ensuring that the fuel injector pulse width is proportional to the amount of fuel it supplies. By including some variable of the fuel injector opening and closing times, the fuel pulse width needed to achieve the fuel mass calculated in (2.6) can be determined by injector flow rate parameters. The mass of fuel delivered, shown in Equation 2.7, demonstrates a relationship to the injector flow rate (IFR), the fuel pulse width (FPW) time ($t_{FPW}$), and the fuel pulse width time correction ($t_C$), used to account for time needed to fully open the injector and close the injector. Furthermore, by equating the mass of fuel delivered in (2.7) to the desired mass of fuel in (2.6), the FPW time needed to supply the desired mass of fuel can be calculated, as shown in Equation 2.8.

$$m_{fuel,del} = IFR*(t_{FPW} - t_C) \tag{2.7}$$

$$t_{FPW} = \frac{P_{man}*V_D*VE}{R*T_{man}*AFR(\text{desired})*IFR} + t_C \tag{2.8}$$

Initially, the system may run in the open-loop mode until temperature and run time thresholds have been achieved, which activates closed-loop control. An oxygen sensor, placed in the exhaust stream, acts as a feedback signal for the closed-loop control algorithm, sensing either a fuel rich or lean mixture. Accordingly, the calculated fuel pulse width time may be adjusted so the oxygen signal constantly switches between rich and lean, ensuring the fuel mixture is always near stoichiometric. A proportional-integral control method may ensure that the air-fuel ratio constantly oscillates around stoichiometric. The proportional component of the controller may be responsible for the size of the fuel pulse width adjustment, which may be determined by the magnitude of the difference between the actual and desired conditions.

Essentially, the proportional factor uses the oxygen sensor feedback to constantly vary the fuel mixture between rich and lean. The integral component is responsible for ensuring that an event, or particular value, will eventually occur by constantly adjusting until the feedback signal surpasses a set value. Therefore, the integral factor increases for a lean fuel mixture and decreases for a rich fuel mixture, ensuring that the controller maintains an air-fuel ratio near 14.6 to 1.

Figure 2:
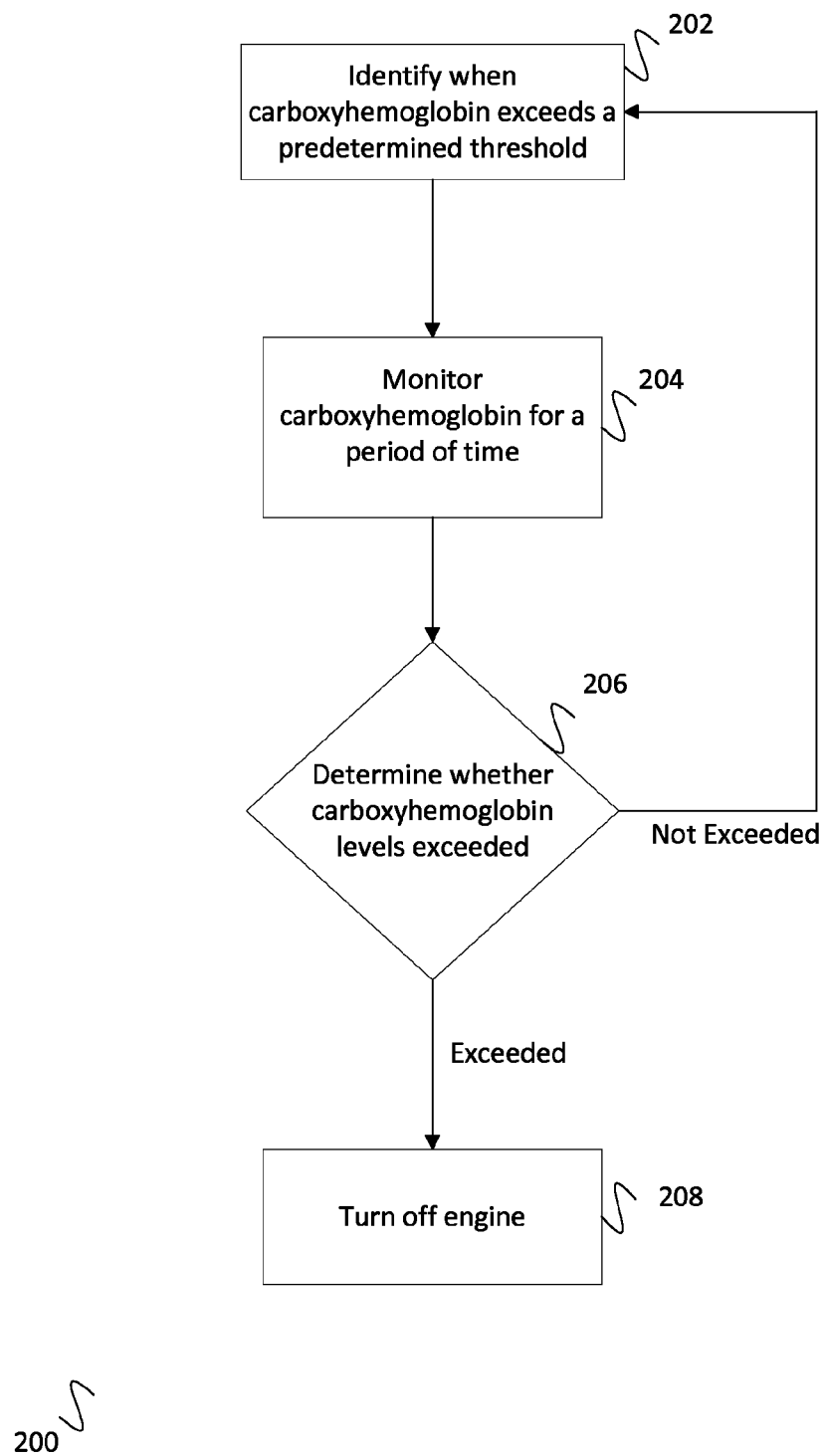
FIG. 2 illustrates an exemplary method for determining when to turn off an engine.

FIG. 2 illustrates an exemplary method 200 for determining when to turn off an engine based on carbon monoxide levels. The method may estimate the oxygen percentage in a gasoline portable generator's intake air without the use of any external emission sensors. By utilizing the gas constant for air, the actual gas constant at the generator's air intake, expected fuel-air ratio, and actual fuel-air ratio, the amount of oxygen in the air intake stream may be estimated. In the ECU, the base fuel pulse width may be calculated by using the gas constant for air and a desired air-fuel mixture ratio. Then, through control system feedback, the actual gas constant at the generator's air intake may be calculated based on the actual fuel pulse width corrected by the controller, also known as the final fuel pulse width. The ratios of the actual intake air gas constant to the gas constant for air and expected fuel-air ratio to actual fuel-air ratio may provide a useful fuel pulse width ratio for oxygen estimation, as shown in Equation 3.1.

$$\left(\frac{F/A|_{exp}}{F/A|_{actual}}\right)\left(\frac{R_{actual}}{R_{air}}\right) = \frac{t_{FPW,base}}{t_{FPW,final}} \quad (3.1)$$

The ratio described in Equation 3.1, in conjunction with the generator's calculated charge air temperature, may be used as a parameter in a linear oxygen estimation equation. In particular, this constant value (C) used for linear estimation is described by the ratio shown in Equation 3.2. A basis of this constant value accurately estimates oxygen once the charge air temperature (CAT) stabilizes.

$$C = \frac{t_{FPW,base}}{t_{FPW,final} * CAT} \quad (3.2)$$

Testing in a variety of situations, within a fully enclosed, partially enclosed, or open space, with or without a catalytic converter, and in a variety of operating conditions may establish that a linear relationship, shown in Equation 3.3, estimates the oxygen percentage in the generator's intake air stream.

$$\% \, O_2 = 175C + 18 \quad (3.3)$$

This is just one example, as other testing environments for different engines may yield differing results. In this example, the foregoing equation may be used a basis for determining when to turn off one exemplary engine. As another example, the linear coefficients, other than 175 and 18 may be mathematically derived, with one example being a final O2 estimation equation is shown in equation (3.4).

$$\% \, O_2 = 201.55C + 16.96 \quad (3.4)$$

With this background, the description will now turn to the exemplary method 200 illustrated in FIG. 2. The previously described oxygen estimation algorithm may detect an enclosed and hazardous operating environment when significant oxygen depletion is detected. Further, the oxygen estimation algorithm may be used to determine the approximate carboxyhemoglobin (COHb) level, which may be used for generator shutdown criteria. The carboxyhemoglobin level may indicate carbon monoxide in the way of magnitude and length of exposure without having to estimate carbon monoxide itself. For example, the rate of oxygen decrease shows correlation with the rate of carboxyhemoglobin increase.

Method 200 therefore may include first identifying when a level of carboxyhemoglobin exceeds a predetermined threshold, as described in more detail below with reference to FIGS. 3 and 4. Next, step 204 monitors carboxyhemoglobin levels for a period of time, such as twenty seconds, although other time intervals may be used. Step 206 may then determine whether carboxyhemoglobin levels have been exceeded throughout the period of time. In one embodiment, the carboxyhemoglobin levels will be considered excessive when all measured levels throughout the period of time exceed the predetermined level, although lower percentages such as seventy-five percent of measurements exceeding the predetermined level may also be used. At step 208, the engine may be turned off if carboxyhemoglobin exceeded the predetermined level during the period of monitoring. If, however, fewer than all of the carboxyhemoglobin levels exceed the threshold, method 202 may return to continue monitoring carboxyhemoglobin levels and allow the engine to continue normal operation. Alternatively, monitoring may continue if a low percentage of carboxyhemoglobin levels exceed the threshold during the monitoring period.

Figure 3:
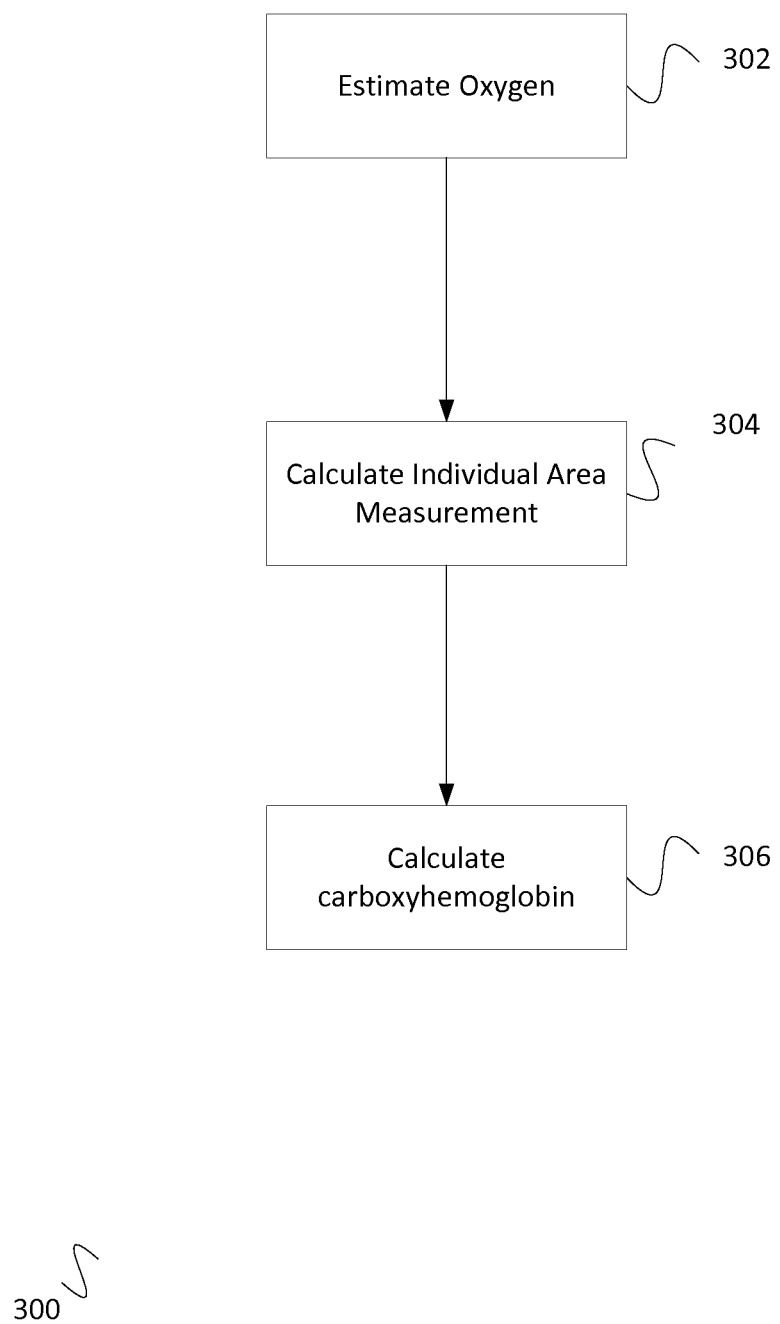
FIG. 3 illustrates a first exemplary method for calculating carboxyhemoglobin levels.

FIG. 3 illustrates an exemplary method 300 for calculating carboxyhemoglobin levels, which may be used in method 200. The rate of oxygen decreasing correlates with increasing carboxyhemoglobin levels. Ambient air contains approximately twenty-one percent oxygen. At step 302, method 300 may estimate oxygen by, for example, calculating: O2_calc=(Base Pulse Width/Final Pulse Width/Charge Air Temp.)*k1+k2, where k1=201.55, k2=16.96. It will be appreciated that other calculations for estimating oxygen may be used, along with different coefficients k1 and k2.

At step 304, the individual area measurement may be calculated. This calculation may occur when closed-loop control has been activated and the estimated oxygen calculated in step 302 is less than what would be found in ambient air, or approximately twenty-one percent oxygen. Of course, other oxygen levels may also be selected. The individual area measurement may be set to zero when oxygen levels exceed twenty-one percent or other numbers sufficiently high to indicate a safe operating environment. If, however, oxygen levels have fallen below a threshold, such as twenty-one percent, trapezoidal integration may be used to calculate individual areas between oxygen estimation and a 21% threshold value, as shown in Equation 3.5.

In equation (3.5), d(t) is the difference between oxygen estimation and 21% at any time (t), d(t−1) is the previous difference, and $t_{elap}$ is the time elapsed between the two difference measurements. Because area may be determined based on current and previous difference measurements, the method may use two or more data points are available to calculate an area. Accordingly, oxygen estimation area (below 21%) may be used at step 306 to estimate carboxyhemoglobin percentage, as shown in Equation 3.6.

$$A_i = \frac{[d(t) + d(t-1)] * t_{elap}}{2} \quad (3.5)$$

$$\% \, COHb = (A_i)k_3 + k_4 \quad (3.6)$$

Coefficients $k_3$ and $k_4$ may provide a trend-oriented estimate of carboxyhemoglobin. Exemplary coefficients are provided in Equation (3.7).

$$\% \text{COHb} = (A_i)10.72 + 2.45 \tag{3.7}$$

A 10% carboxyhemoglobin (COHb) threshold may indicate indoor operation and an oxygen depleted environment. The carboxyhemoglobin measurement of 10% therefore may serve as an exemplary threshold in step 202. Returning to FIG. 2, as previously described, method 200 may then monitor carboxyhemoglobin for a period of time (step 204), continue determining whether carboxyhemoglobin levels have exceeded a determined threshold, such as 10% (step 206), and turn off the engine (step 208) when a safe carboxyhemoglobin level have been exceeded for period of time, such as twenty seconds. Therefore, the safety shutdown feature may trigger if the trend-oriented COHb estimate exceeds 10% constantly for twenty seconds. Twenty seconds is a sufficiently long time to avoid false turn-offs due to a temporary spike in carboxyhemoglobin levels, but also short enough to ensure a safe working environment. Other time periods may also be selected depending on, for example, the operating environment.

In an alternative embodiment, base volumetric efficiency and final volumetric efficiency may be used in the closed-loop control method, as opposed to base fuel pulse width and final fuel pulse width. This utilization of volumetric efficiency may allow for a simplistic engine tuning strategy, as a variable used in open-loop and closed-loop control regulation, because of its ability to be easily altered in a calibration lookup table based on RPM and MAP. Volumetric efficiency may define air quantity entering the cylinder(s), indicating the quotient of base volumetric efficiency (before closed-loop control correction) and final volumetric efficiency (after closed-loop control correction) provides a ratio which defines the magnitude of controller compensation for oxygen deficiency in the generator's intake air stream. Likewise, because fuel pulse width may define fuel quantity entering the cylinder, the ratio of base fuel pulse width (fuel pulse width before closed-loop control correction) to final fuel pulse width (fuel pulse width after closed-loop control correction) may indicate how much the control system has to compensate for the oxygen deficit in the intake air stream. Therefore, the two ratios utilizing VE and fuel pulse width may measure similar quantities and can be concluded to be equivalent, as shown in Equation 4.1. Furthermore, substituting this ratio equivalence from (4.1) into the generator dependent variable (C) from (3.2), used in the newly derived oxygen estimation equation, it can be redefined in terms in terms of base VE and final VE, as shown in Equation 4.2.

$$\frac{t_{FPW,base}}{t_{FPW,final}} = \frac{VE_{base}}{VE_{final}} \tag{4.1}$$

$$C = \frac{VE_{base}}{VE_{final} * CAT} \tag{4.2}$$

Figure 4:
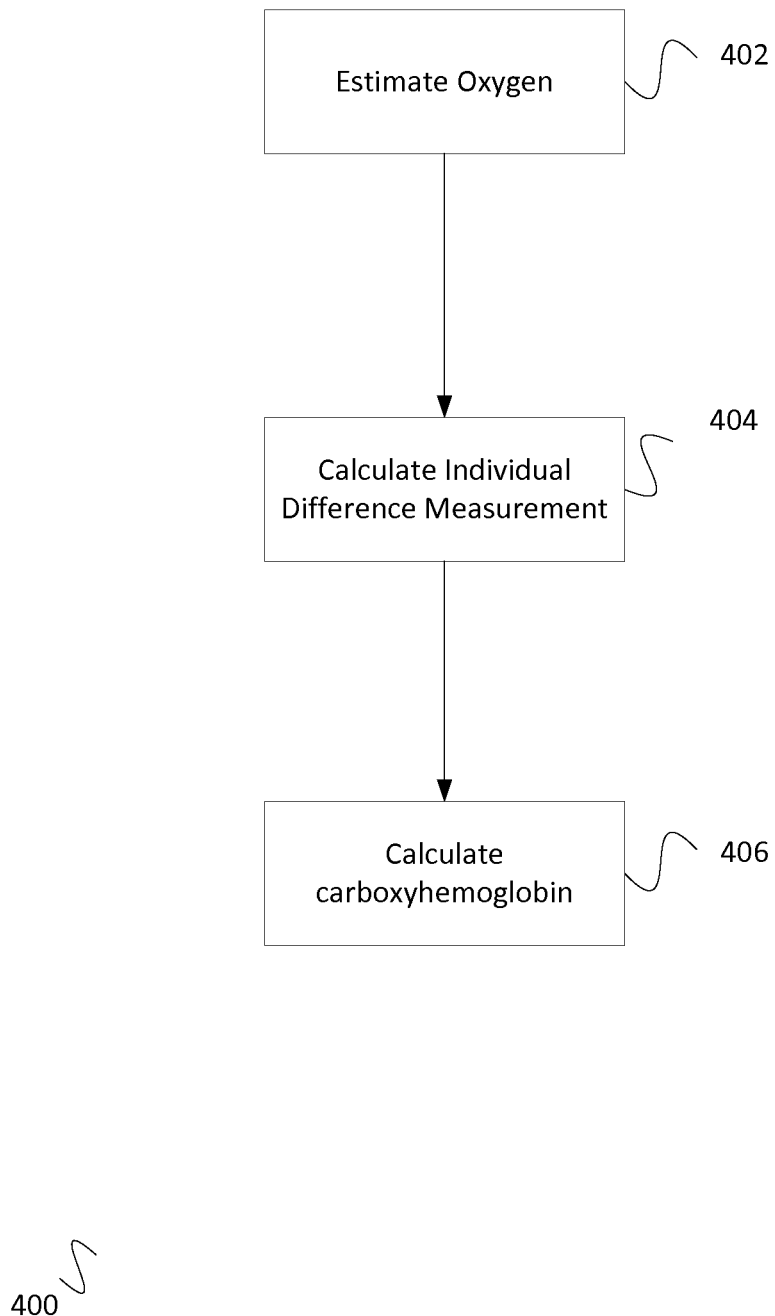
FIG. 4 illustrates a second exemplary method for calculating carboxyhemoglobin levels.

FIG. 4 illustrates a second exemplary method 400 for calculating carboxyhemoglobin and determining when to turn off an engine. This embodiment may use individual difference measurements, as opposed to the individual area calculations, to develop a new trend-oriented COHb estimate with minimal deviation. For example, the general COHb estimate equation in (3.7) may be altered to include the individual difference measurements ($d_i$), instead of individual area measurements, with new constant coefficients $k_3$ and $k_4$.

$$\% \text{COHb}_{new} = (d_i)k_3 + k_4 \tag{4.3}$$

At step 402, method 400 may estimate oxygen, as described above with reference to FIG. 3, using the equation O2_calc=(Base Pulse Width/Final Pulse Width/Charge Air Temperature)*k1+k2, where k1 and k2 may be constants, such as k1=201.55, k2=16.96. When the oxygen level drops below a determined threshold, such as twenty-once percent for ambient air, at step 404, the individual difference measurement may be calculated. For example, when closed-loop control has been activated, and the oxygen estimation is below the threshold of twenty-one percent, the individual difference may be calculated as Individual Difference=21-Current O2_calc. If the oxygen estimation exceeds twenty-one percent, the individual difference may be set to zero to indicate a safe operating environment.

At step 406, the carboxyhemoglobin level may be calculated using, for example, the formula COHb_calc=(Individual Difference)*k3+k4, where examples of coefficients k3 and k4 include k3=6.14 and k4=2.43. As discussed above with reference to FIG. 2, if the carboxyhemoglobin level exceeds a predetermined level such as ten percent, a timer may start and the carboxyhemoglobin level may be checked for a period of time, such as twenty seconds, to see if carboxyhemoglobin levels remain too high for safe operation. If so, the engine may be turned off.

Systems and methods consistent with the description therefore allow carboxyhemoglobin levels to be used to determine when to turn off an engine, without the need for any additional sensors, such as a carbon monoxide sensor. This is true for a variety of operating environments and whether the engine operates under constant load, a low load, a medium load, a high load, and varying loads. The engine may ultimately be turned off using a variety of techniques that will be appreciated by one of skill in the art, such as disabling the fuel injector(s) by forcing the fuel pulse width to zero, stopping the ignition process, or disabling off the ECU.

Figure 5:
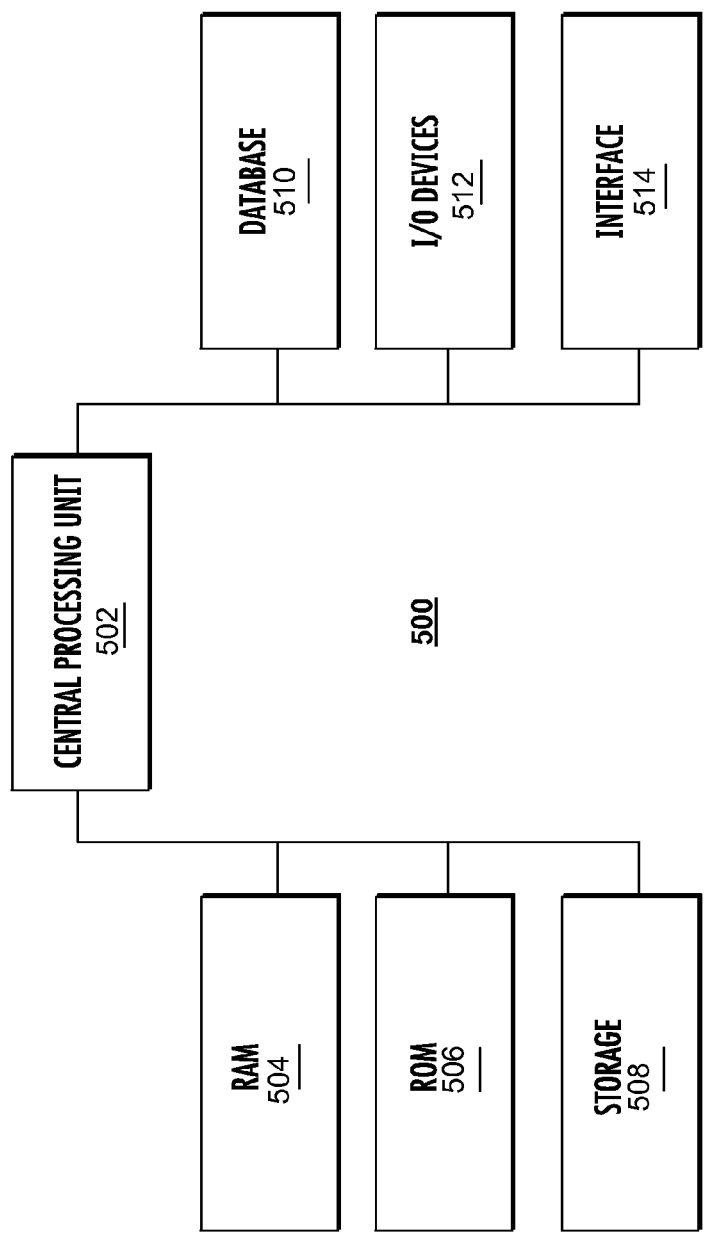
FIG. 5 illustrates an exemplary computer that can comprise at least a portion of host PC and/or real-time ECU.

FIG. 5 illustrates an exemplary computer that can comprise at least a portion of host PC 102 and/or real-time ECU 104.

The computer 500 may include one or more basic hardware components such as, for example, a central processing unit (CPU) 502, a random access memory (RAM) module 504, a read-only memory (ROM) module 506, a storage 508, a database 510, one or more input/output (I/O) devices 512, and an interface 514. Alternatively and/or additionally, the computer 500 may include one or more software components such as, for example, a computer-readable medium including computer executable instructions for performing a method associated with the exemplary embodiments. It is contemplated that one or more of the hardware components listed above may be implemented using software. For example, storage 508 may include a software partition associated with one or more other hardware components. It is understood that the components listed above are exemplary only and not intended to be limiting.

CPU 502 may include one or more processors, each configured to execute instructions and process data to perform one or more functions associated with a computer for controlling an engine. CPU 502 may be communicatively coupled to RAM 504, ROM 506, storage 508, database 510, I/O devices 512, and interface 514. CPU 502 may be configured to execute sequences of computer program instructions to perform various processes. The computer program instructions may be loaded into RAM 504 for execution by CPU 502.

RAM 504 and ROM 506 may each include one or more devices for storing information associated with operation of CPU 502. For example, ROM 506 may include a memory device configured to access and store information associated with a host PC 102, including information for identifying, initializing, and monitoring the operation of one or more components and subsystems. RAM 504 may include a memory device for storing data associated with one or more operations of CPU 502. For example, ROM 506 may load instructions into RAM 504 for execution by CPU 502.

Storage 508 may include any type of mass storage device configured to store information that CPU 502 may need to perform processes consistent with the disclosed embodiments. For example, storage 508 may include one or more magnetic and/or optical disk devices, such as hard drives, CD-ROMs, DVD-ROMs, or any other type of mass media device.

Database 510 may include one or more software and/or hardware components that cooperate to store, organize, sort, filter, and/or arrange data used by CPU 502. For example, database 510 may include data relating to monitoring or controlling any aspect of an engine, such as shown in FIG. 1. It is contemplated that database 510 may store additional and/or different information than that listed above.

I/O devices 512 may include one or more components configured to communicate information with ECU 104 or host PC 104. For example, I/O devices 512 may include a console with an integrated keyboard and mouse to allow a user to maintain a database of images, update associations, and access digital content. I/O devices 512 may also include a display including a graphical user interface (GUI) for outputting information on a monitor. I/O devices 512 may also include peripheral devices such as, for example, a printer for printing information associated with an engine, a user-accessible disk drive (e.g., a USB port, a floppy, CD-ROM, or DVD-ROM drive, etc.) to allow a user to input data stored on a portable media device, a microphone, a speaker system, or any other suitable type of interface device.

Interface 514 may include one or more components configured to transmit and receive data via a communication network, such as the Internet, a local area network, a workstation peer-to-peer network, a direct link network, a wireless network, or any other suitable communication platform. For example, interface 514 may include one or more modulators, demodulators, multiplexers, demultiplexers, network communication devices, wireless devices, antennas, modems, and any other type of device configured to enable data communication via a communication network.

Any combination of one or more computer readable medium(s) may be utilized. The computer readable medium may be a computer readable signal medium or a computer readable storage medium. A computer readable storage medium may be, for example, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer readable medium may be transmitted using any appropriate medium, including but not limited to wireless, wireline, optical fiber cable, RF, etc., or any suitable combination of the foregoing.

Computer program code for may be written in any combination of one or more programming languages, including an object oriented programming language such as Java, Smalltalk, C++, or the like, and conventional procedural programming languages, such as the "C" programming language or similar programming languages. The program code may execute entirely on the computing unit.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

It should be appreciated that the logical operations described herein with respect to the various figures may be implemented (1) as a sequence of computer implemented acts or program modules (i.e., software) running on a computing device, (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications may be referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method for determining when to turn off an engine, comprising:
   estimating, by an engine control unit (ECU) of an engine management system, an amount of available oxygen at an intake of an engine;
   determining, by the ECU, d(t), wherein d(t) is a difference between the estimated amount of available oxygen and an amount of oxygen in ambient air at any time (t);
   identifying, by the ECU, when an amount of carboxyhemoglobin exceeds a predetermined threshold based at least in part on the estimated amount of available oxygen at the intake of the engine;
   monitoring, by the ECU, the amount of carboxyhemoglobin for a period of time;
   determining, by the ECU, when the amount of carboxyhemoglobin exceeds the predetermined threshold during the time period; and
   turning off the engine, by the ECU, when the amount of carboxyhemoglobin exceeds the predetermined threshold during the time period.

2. The method of claim 1, wherein identifying when an amount of carboxyhemoglobin exceeds a predetermined threshold comprises calculating the amount of carboxyhemoglobin based on an individual area measurement.

3. The method of claim 2, wherein the individual area measurement is calculated:

$$A_i = \frac{[d(t) + d(t-1)] * t_{elap}}{2},$$

where $A_i$ is the individual area measurement, $d(t)$ is the difference between the amount of available oxygen and the amount of oxygen in ambient air at any time (t), $d(t-1)$ is the previous difference between the amount of available oxygen and the amount of oxygen in ambient air at any time (t), and $t_{elap}$ is the time elapsed between the two difference measurements.

4. The method of claim 2, wherein the amount of carboxyhemoglobin is calculated:

$$\%COHb = (A_i)k_3 + k_4,$$

where % COHb is the amount of carboxyhemoglobin, $A_i$ is the individual area measurement, and $k_3$ and $k_4$ are constant coefficients.

5. The method of claim 1, wherein identifying when an amount of carboxyhemoglobin exceeds a predetermined threshold comprises calculating the amount of carboxyhemoglobin based on an individual difference measurement.

6. The method of claim 5, wherein the amount of carboxyhemoglobin is calculated:

$$\%COHb_{new} = (d_i)k_3 + k_4$$

where % COHb is the amount of carboxyhemoglobin, $d_i$ is the individual difference measurement, and $k_3$ and $k_4$ are constant coefficients.

7. The method of claim 1, wherein determining, by the ECU, d(t), the difference between the estimated amount of available oxygen and the amount of oxygen in ambient air at any time comprises the ECU calculating d(t)=21—the estimated amount of available oxygen.

8. A system for determining when to turn off an engine, comprising:
   an engine management system, said engine management system comprising at least an engine control module (ECM) and a fuel control module in communication with the ECM, said ECM comprising at least a processor and memory, wherein said processor executes computer-readable instructions stored on the memory, said computer-readable instructions cause the processor to:
   estimate an amount of available oxygen at an intake of an engine using at least a ratio of an expected fuel pulse width to a measured fuel pulse width as measured by the fuel control module;
   determine d(t), wherein d(t) is a difference between the estimated amount of available oxygen and an amount of oxygen in ambient air at any time (t);
   identify when an amount of carboxyhemoglobin exceeds a predetermined threshold based at least in part on the estimated amount of available oxygen at the intake of the engine;
   monitor the amount of carboxyhemoglobin for a period of time;
   determine when the amount of carboxyhemoglobin exceeds the predetermined threshold during the time period; and
   turn off the engine when the amount of carboxyhemoglobin exceeds the predetermined threshold during the time period.

9. The system of claim 8, wherein the processor executes computer-readable instructions stored on the memory that cause the processor to: identify when an amount of carboxyhemoglobin exceeds a predetermined threshold by calculating the amount of carboxyhemoglobin based on an individual area measurement.

10. The system of claim 9, wherein the processor executes computer-readable instructions stored on the memory that cause the processor to calculate the individual area measurement as:

$$A_i = \frac{[d(t) + d(t-1)] * t_{elap}}{2},$$

where $A_i$ is the individual area measurement, $d(t)$ is the difference between the amount of available oxygen and the amount of oxygen in ambient air at any time (t), $d(t-1)$ is the previous difference between the amount of available oxygen and the amount of oxygen in ambient air at any time (t), and $t_{elap}$ is the time elapsed between the two difference measurements.

11. The system of claim 9, wherein the processor executes computer-readable instructions stored on the memory that cause the processor to calculate the amount of carboxyhemoglobin as:

$\%COHb = (A_i)k_3 + k_4,$ where % COHb is the amount of carboxyhemoglobin, $A_i$ is the individual area measurement, and $k_3$ and $k_4$ are constant coefficients.

12. The system of claim 8, wherein the processor executes computer-readable instructions stored on the memory that cause the processor to identify when an amount of carboxyhemoglobin exceeds a predetermined threshold by calculating the amount of carboxyhemoglobin based on an individual difference measurement.

13. The system of claims 12, wherein the processor executes computer-readable instructions stored on the memory that cause the processor to calculate the amount of carboxyhemoglobin as:

$\%COHb_{new} = (d_i)k_3 + k_4,$ where % COHb is the amount of carboxyhemoglobin, $d_i$ is the individual difference measurement, and $k_3$ and $k_4$ are constant coefficients.

14. The system of claim 8, wherein the processor executes computer-readable instructions stored on the memory that cause the processor to calculate d(t), the difference between the estimated amount of available oxygen and the amount of oxygen in ambient air at any time comprises the ECU calculating d(t)=21—the estimated amount of available oxygen.

15. A computer-readable medium, tangibly embodied in a memory device, comprising instruction which, when executed by a processor, perform a method for determining when to turn off an engine, said processor comprising at least a portion of an engine control unit (ECU), the method comprising:
estimating, by the ECU, an amount of available oxygen at an intake of an engine;
determining, by the ECU, d(t), wherein d(t) is a difference between the estimated amount of available oxygen and an amount of oxygen in ambient air at any time (t);
identifying, by the ECU, when an amount of carboxyhemoglobin exceeds a predetermined threshold;
monitoring, by the ECU, the amount of carboxyhemoglobin for a period of time;
determining, by the ECU, when the amount of carboxyhemoglobin exceeds the predetermined threshold during the time period; and
turning off the engine, by the ECU, when the amount of carboxyhemoglobin exceeds the predetermined threshold during the time period.

16. The computer-readable medium method of claim 15, wherein identifying when an amount of carboxyhemoglobin exceeds a predetermined threshold comprises calculating the amount of carboxyhemoglobin based on an individual area measurement.

17. The computer-readable medium of claim 16, wherein the individual area measurement is calculated:

$$A_i = \frac{[d(t) + d(t-1)] * t_{elap}}{2},$$

where $A_i$ is the individual area measurement, $d(t)$ is the difference between the amount of available oxygen and the amount of oxygen in ambient air at any time (t), $d(t-1)$ is the previous difference between the amount of available oxygen and the amount of oxygen in ambient air at any time (t), and $t_{elap}$ is the time elapsed between the two difference measurements.

18. The computer-readable medium of claim 16, wherein the amount of carboxyhemoglobin is calculated:

$\%COHb = (A_i)k_3 + k_4,$ where % COHb is the amount of carboxyhemoglobin, $A_i$ is the individual area measurement, and $k_3$ and $k_4$ are constant coefficients.

19. The computer-readable medium of claim 15, wherein identifying when an amount of carboxyhemoglobin exceeds a predetermined threshold comprises calculating the amount of carboxyhemoglobin based on an individual difference measurement.

20. The computer-readable medium of claim 19, wherein the amount of carboxyhemoglobin is calculated:

$\%COHb_{new} = (d_i)k_3 + k_4,$ where % COHb is the amount of carboxyhemoglobin, $d_i$ is the individual difference measurement, and $k_3$ and $k_4$ are constant coefficients.

21. The computer-readable medium of claim 15, wherein calculating d(t), the difference between the estimated amount of available oxygen and the amount of oxygen in ambient air at any time comprises the ECU calculating d(t)=21—the estimated amount of available oxygen.

* * * * *